F. A. MITCHELL.
TRUCK ATTACHMENT FOR TRACTORS.
APPLICATION FILED APR. 22, 1920.
1,397,053.
Patented Nov. 15, 1921.
3 SHEETS—SHEET 1.
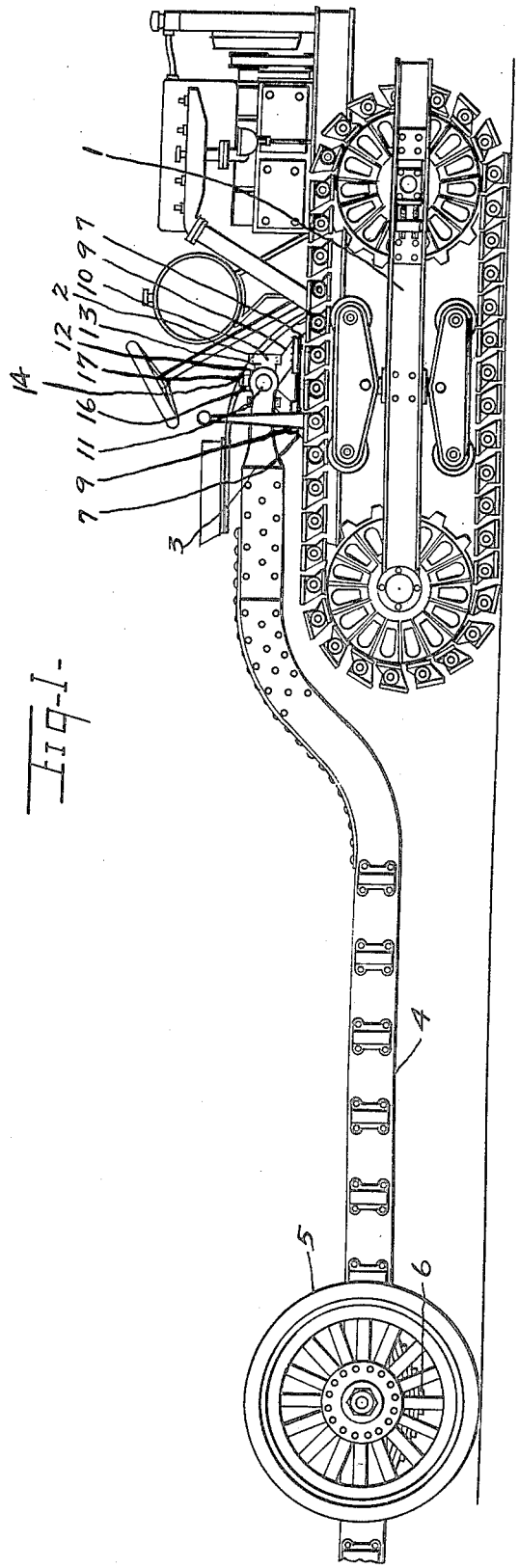
INVENTOR
Floyd Andrew Mitchell
BY David E. Lofgren
ATTORNEY

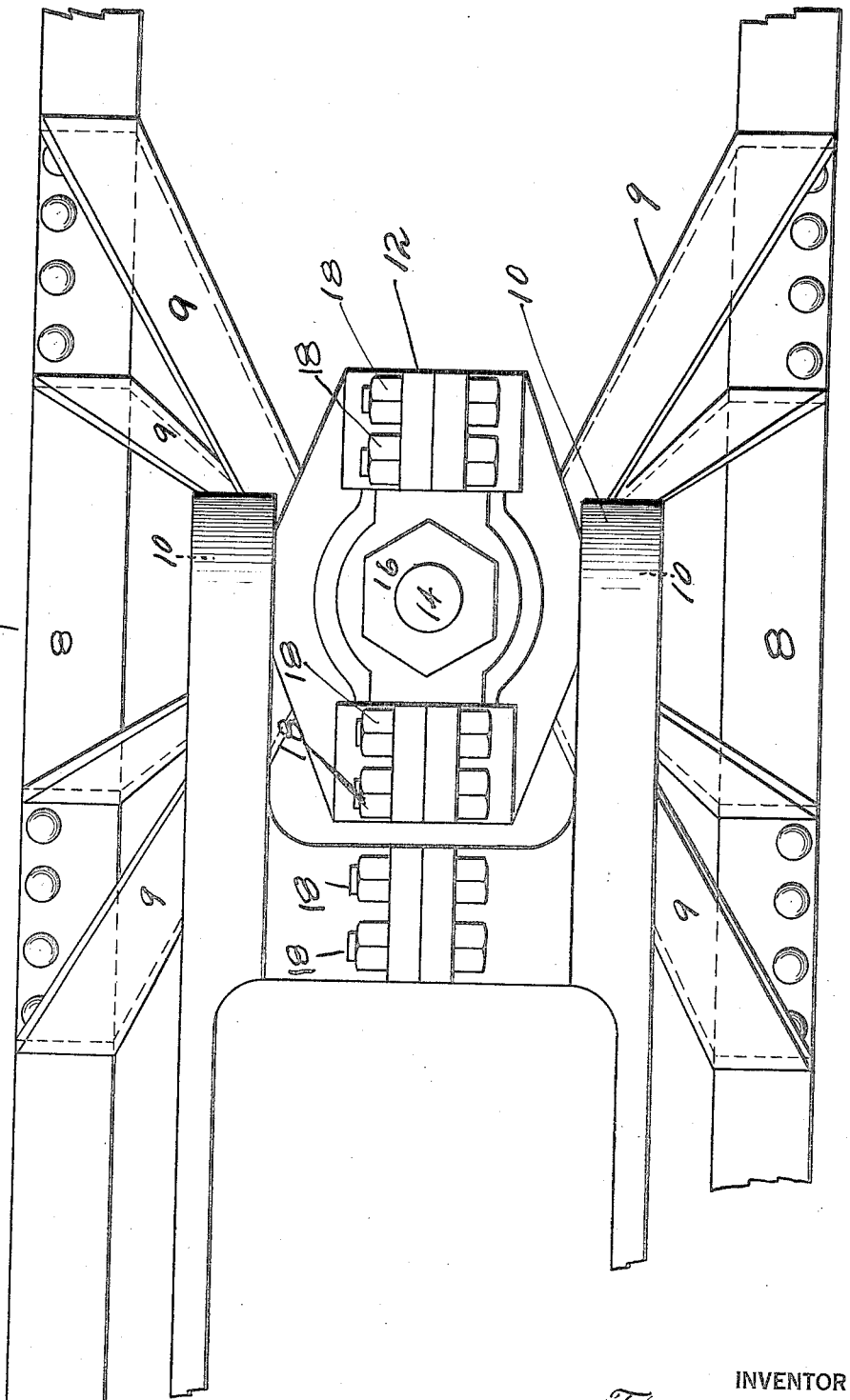

F. A. MITCHELL.
TRUCK ATTACHMENT FOR TRACTORS.
APPLICATION FILED APR. 22, 1920.
1,397,053.
Patented Nov. 15, 1921.
3 SHEETS—SHEET 3.
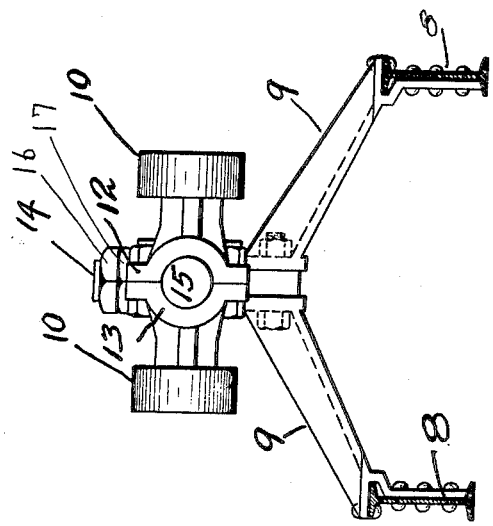
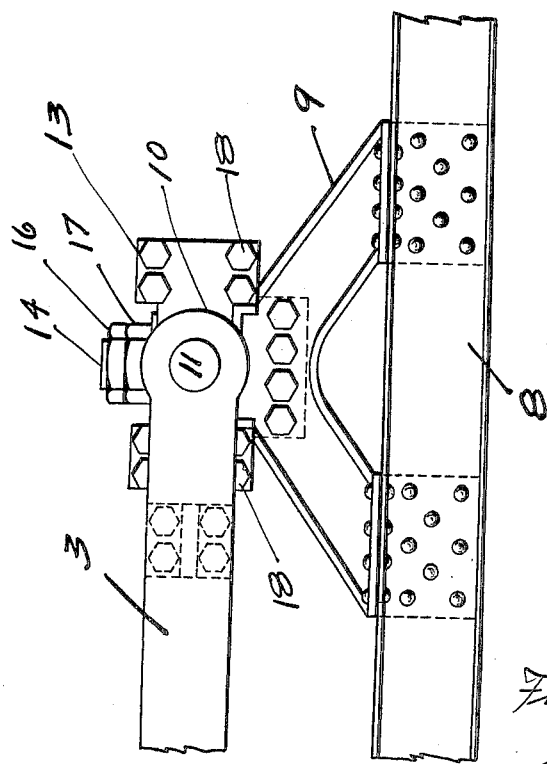
INVENTOR
Floyd Andrew Mitchell
BY
David E. Lofgren
ATTORNEY

UNITED STATES PATENT OFFICE.

FLOYD A. MITCHELL, OF PORTLAND, OREGON.

TRUCK ATTACHMENT FOR TRACTORS.

1,397,053.   Specification of Letters Patent.   Patented Nov. 15, 1921.

Application filed April 22, 1920. Serial No. 375,865.

*To all whom it may concern:*

Be it known that I, FLOYD ANDREW MITCHELL, a citizen of the United States, residing at Portland, in the county of Multnomah and the State of Oregon, have invented certain new and useful Improvements in Truck Attachments for Tractors, of which the following is a specification.

My invention relates to tractors, and the objects of my invention are to provide a trailer attachment for a tractor, and a means of connecting same to the tractor, in such manner that the trailer may be readily detached to allow the tractor to be used for other purposes, and at the same time afford a safe means of pulling the trailer without bending strains on the trailer or tractor frame.

I attain these objects by means of the mechanism illustrated in the accompanying drawings, in which:

Figure 1 is an elevational view from the side of the completely assembled trailer and tractor.

Fig. 2 is a plan view of the king bolt, universal joint, and supports from above.

Fig. 3 is an elevational view, from the side, of the universal joint and connections.

Fig. 4 is an elevational view, from the front, of the universal joint and connections.

The tractor may be a machine of the endless track or the wheel type, as I do not confine myself to any one make or type of machine, my invention being adaptable to many different types, the endless track type being used in the drawing to illustrate only one application.

Connected to the tractor 1 by means of the universal joint 2 is the forward end of the trailer frame 3 which is an extension of the main frame 4 of the trailer. This frame is supported at the rear end by the wheels 5 and is cushioned by the heavy spring 6.

The universal joint 2, which will be hereinafter more specifically described will allow the tractor to turn, to tilt sidewise, and to tilt longitudinally without throwing any bending or twisting strains on the frame 4.

It will be readily understood from an inspection of the drawings that the tractor may be disconnected, with ease, to allow the use of same for other purposes.

Connected by means of the plates 7 7 to the frame 8 of the tractor are the members 9 9 which support the king bolt and the universal joint and to which are connected the draft members 10 10.

The horizontal cross pin member 11, about which the draft members 10 10 are free to revolve, together with the castings or forgings 12 and 13 comprise the main parts of the universal joint, the action of which is plain when it is understood that the entire assembly is free to revolve about the vertical rigid pin 14, as well as about the horizontal pin 15.

The trailer may be readily disconnected by removing the nuts 16 and 17 and lifting the universal joint off of the vertical king pin 14, and the entire assembly may be dismantled by removing the bolts indicated by the numeral 18.

Having thus fully described my invention, I claim, and desire to protect by Letters Patent:

1. In combination, a tractor of the endless track or other type, a longitudinally disposed frame supported by wheels in the rear and by said tractor at the front through a universal joint, said joint comprising a vertical king pin rigidly secured to the tractor frame, a T member disposed about said king pin having the center line thereof in the same vertical plane as the center line of said trailer or longitudinally disposed frame, ends of the T forming bearings for the draft pin structure the center line of which is at right angles to the T.

2. In combination, a tractor of endless track or other type, a trailer attachment connected to said tractor by a universal joint, the king pin of which is rigidly secured to the frame of said tractor, a T member disposed there about and subject to rotate in the horizontal plane, the T ends forming bearings for the horizontal draft pin structure, the center line of which is at right angles to that of the T center line, and subject to rotate in the vertical plane at right angles to the center line of said T, the combination forming a tractor truck adapted to heavy duty, substantially as described.

FLOYD A. MITCHELL